United States Patent [19]

Peng

[11] Patent Number: 4,859,495
[45] Date of Patent: Aug. 22, 1989

[54] METHOD OF PREPARING PERPENDICULARLY ORIENTED MAGNETIC RECORDING MEDIA

[75] Inventor: James P. Peng, Rochester, N.Y.

[73] Assignee: Eastman Kodak Co., Rochester, N.Y.

[21] Appl. No.: 168,210

[22] Filed: Mar. 15, 1988

[51] Int. Cl.4 .............................................. B05D 3/14
[52] U.S. Cl. ..................................... 427/48; 427/128; 427/289; 428/64; 428/294; 428/900
[58] Field of Search ......................... 427/48, 127–132, 427/289; 428/900, 64, 694

[56] References Cited

U.S. PATENT DOCUMENTS 3,117,065  1/1964  Wootten ................................ 204/20
4,518,627  5/1985  Foley et al. .......................... 427/48
4,578,280  3/1986  Greiner et al. ....................... 427/47

FOREIGN PATENT DOCUMENTS 57-198545  12/1982  Japan.

Primary Examiner—Bernard Pianalto
Attorney, Agent, or Firm—Robert A. Gerlach

[57] ABSTRACT

A method of making a magnetic recording film having magnetic particles aligned in a given direction by subjecting an unfixed magnetic paint on a substrate to a rotating magnetic field having magnetic components only in a plane perpendicular to the given direction.

5 Claims, 1 Drawing Sheet

METHOD OF PREPARING PERPENDICULARLY ORIENTED MAGNETIC RECORDING MEDIA

FIELD OF THE INVENTION

This invention relates to a method of making magnetic recording media and, more particularly, to a method of making a magnetic recording media having the magnetic particles oriented in a direction perpendicular to the plane of the recording media.

BACKGROUND OF THE INVENTION

It is desired to produce magnetic recording media having the highest possible recording density. One technique to achieve this is to orient the magnetic particles in the magnetic media in a direction perpendicular to the plane of the media or to the plane of the substrate to which the media is applied (the Z direction). A conventional method of orienting magnetic particles is to maintain the magnetic coating or paint as it is applied to a substrate in an orienting magnetic field until the paint is sufficiently dried to maintain the particles in the desired fixed position. This presents no serious problem when the particles are aligned in the plane of the substrate because they will not tend to move from the position initially brought about by the magnetic field. However, when the desire is to align or orient the particles in the direction perpendicular to the plane of the film, other forces are involved which tend to cause the magnetic particles to revert to the direction in the plane of the substrate. Thus, either the coating must be maintained within the vertical aligning magnetic field until it becomes sufficiently dried to support the particles in the Z direction or the viscosity of the coating composition must be raised to the point where it will support the magnetic particles even after the removal of the magnetic aligning field until the coating is fixed and will thereby support the particles. In the former instance this is impractical because when a substrate is being coated with a magnetic paint at high speeds, such as speeds running into hundreds of feet per second, the magnetic field would be required over several hundreds of feet even if the coating required only two or three seconds to become dry. The latter technique, that being the increase of viscosity of the coating composition creates problems because as the viscosity increases, it becomes more difficult to align the particles in the desired direction because the forces required are greater.

The difficulty in orienting the magnetic media in the vertical direction is rendered even more severe due to the demagnetization related to this direction. If every particle in the magnetic media, with saturation magnetization of Ms is perfectly oriented in the positive Z direction, the demagnetization field will be $4\pi Ms$ pointed in the negative Z direction. A typical value of $4\pi Ms$ demagnetization field is about 1000 Oe for cobalt doped iron oxide film. Under such a strong demagnetization field, the magnetic particles in a normal viscous dispersion cannot maintain the vertical orientation outside the magnetic field for more than a few seconds. Therefore, as the coated medium leaves the applied orienting field, the magnetic particles rotate down to the in-plane directions.

SUMMARY OF THE INVENTION

The present invention provides a method of making magnetic recording films having the magnetic particles oriented in the direction perpendicular to the plane of the film by applying a magnetic paint to a substrate, subjecting the substrate containing the magnetic paint in a non-fixed condition to a rotating magnetic field having no magnetic component in the direction perpendicular to the plane of the substrate and fixing the magnetic paint. By this method, high speeds can be employed in the preparation of the magnetic paint coated substrate because once the particles achieve orientation in a direction perpendicular to the plane of the substrate, they will remain in that position until fixing of the magnetic paint occurs. Thus, in accordance with this invention the applied magnetic field has components residing only in the plane of the substrate and not in any direction other than the plane of the substrate.

It is also to be understood that the method of this invention can be employed to orient the magnetic particles in a magnetic recording element in any given direction by applying a rotating magnetic field having magnetic components that lies only in a plane perpendicular to the given direction.

DETAILED DESCRIPTION OF THE INVENTION

The present invention provides a method for the manufacture of a magnetic recording film wherein a substrate is coated with a layer of magnetic paint and prior to fixing the paint, the substrate containing the paint is subjected to a rotating magnetic field having magnetic components that lie only within the plane of the substrate, the magnetic paint is subsequently fixed by hardening of the binder material. By magnetic paint is meant a fluid composition including a resinous binder containing magnetic particles which is capable of being fixed by any of the conventional techniques such as, solvent evaporation, chemical curing, E-beam curing and the like.

Any suitable polymeric binder material may be used in the preparation of the magnetic paint in accordance with this invention such as for example, polyurethanes, epoxy resins, polyesters, vinyl polymers including vinyl chloride, vinyl acetate, vinyl alcohol and copolymers thereof, polyvinylidene chloride, methacrylate and alkyl methacrylate resins, alkyl resins, cellulose materials, synoxide resins, and the like.

According to the present invention, the process is not limited to particular magnetic materials or pigments but is applicable, for example to the various magnetic pigments known in the arts such as, $Fe_3O_4$, $\gamma$-$Fe_2O_3$, chromium oxide, barium ferrites, rare earth metals, cobalt doped $\gamma Fe_2O_3$ or $Fe_3O_4$, ferrimagnetic metal elements or alloys such as, Fe, Co, Fe-Co, Fe-Co-Ni, Fe-Co-B, Fe-Co-Cr-B, Mn-Bi, Mn-Al and the like.

In addition to the magnetic pigment, the binder materials may also include one or more curing agents to facilitate chemical or radiation induced crosslinking, antistatic agents, such as carbon black or graphite; abrasive particles, such as fused alumina, silicon carbide or chromium oxide; lubricates such as aliphatic acid esters or organic silicon compound; dispersants such as lecithin, esters of phosphoric acid and the like or combinations of any of the above-mentioned materials.

The substrate may be of any suitable materials such as for example, polymeric films including polyesters such as polyethylene terephthalate, polyolefin, including polypropylene and polyethylene, polycarbonates, polyvinyl chloride, polyamides, cellulous polymers or non-magnetic metal foils such as copper, aluminium, zinc or the like.

Figure 1:
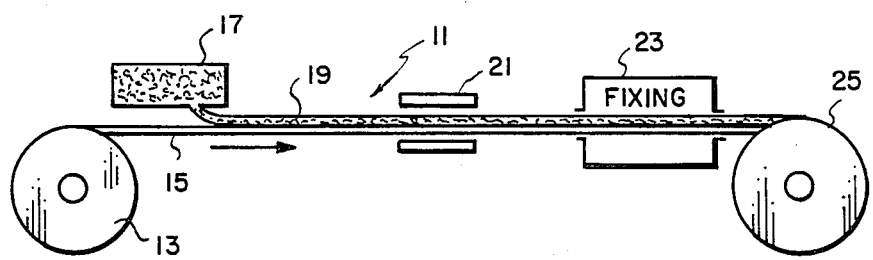
FIG. 1 is a diagramatic sectional view of an apparatus suitable for carrying out the method of this invention.

The process in accordance with this invention will be further illustrated with reference to the figures wherein FIG. 1 is a diagramatic view of an apparatus 11 suitable for carrying out the process of this invention. In this figure supply roll 13 provides a source for the substrate which may be as indicated above any suitable material in sheet form. The substrate 15 is removed from the supply roll 13 and passes under a coating apparatus 17 which can be any method suitable for applying uniform layers of coatings to the substrate including air doctor coating, blade coating, rod coating, extrusion coating, air knife coating, squeeze-coating, impregnation coating, reverse roll coating, transfer roll coating, gravure coating, kiss-roll coating, cast coating, spray coating, spin coating and the like. The substrate 15, bearing the still fluid magnetic paint coating 19 moves in the direction shown by the arrow to the orientation station 21 wherein the still fluid paint layer 19 is subjected to a rotating magnetic field being free of any magnetic component other than those components residing in the plane of the substrate. Within this station, the magnetic particles align themselves perpendicular to the horizontal axis or the plane of the substrate with random orientation of the north and south poles in the vertical direction. After exiting the orientation station 21, the paint coated substrate film passes through a fixing station 23 wherein the paint layer is hardened by any of the techniques known in the art including drying, solvent evaporation, electron beam curing, chemical reaction, and the like. The magnetic media film is then wound on takeup roll 25 from which the final magnetic recording media can be fabricated by cutting, stamping and the like. When it is desired to prepare disks for example, the proper sized disk may be punched from the film. When tape is desired it can be slit from the finished film in the width desired. In the preparation in accordance with the procedure shown in FIG. 1, the width of the film can vary from less than one inch to as wide as feasible. Generally films are prepared in widths up to thirty or forty inches. It may be desirable to provide prior to the takeup roll 25 a station wherein the vertical aligned magnetic particles in the magnetic paint layer 19 are all oriented such that all of the north pole and all of the south poles point in the same direction. This can be accomplished by imposing across the width of the film an aligning magnetic field causing the orientation of all of the particles to align in the same direction.

Figure 2:
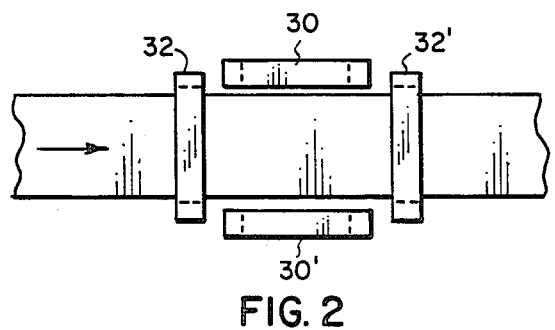
FIG. 2 is a diagramatic illustration of a first embodiment of a means for applying a rotating magnetic field having magnetic components only in the plane of the substrate.

FIG. 2 represents one technique whereby a rotating magnetic field can be impressed upon the magnetic particles present in the magnetic paint layer 19 present on the substrate 15 by the use of two pair of Helmholtz coils which are arranged at right angles to each other. The first pair represented by reference character 30 and 30' is disposed along the edges of the moving web of the substrate 15 containing the still fluid magnetic paint layer 19 while the second pair 32 and 32' are arranged across the width of the web. The current impressed upon each pair of Helmholtz coils is 90° out of phase with respect to that imposed on the other pair of coils. That is, the current $I_1$ in the coils 30 and 30' is 90° out of phase from $I_2$, the current in coils 32 and $32^1$. Thus, for a flux density in the center of the coil of 250 gauss for coils 6.6 cm in diameter and having 100 turns, the current is 1.8 amperes. By this arrangement, a rotating magnetic field having no vertical magnetic component or component outside of the plane of the film is induced in the paint film layer causing the magnetic particles therein to stabilize in the vertical or Z direction. Because the particles are randomly distributed with both north and south poles pointing in a given direction either up or down, the particles remain in that position and are fixed in that position by solidification or curing of the paint layer 19. This technique is suitable for the preparation of widths, for example, up to six or seven inches and is suitable for the preparation of magnetic media running at high rates of speed such as 100 to 200 linear feet per second.

Figure 3:
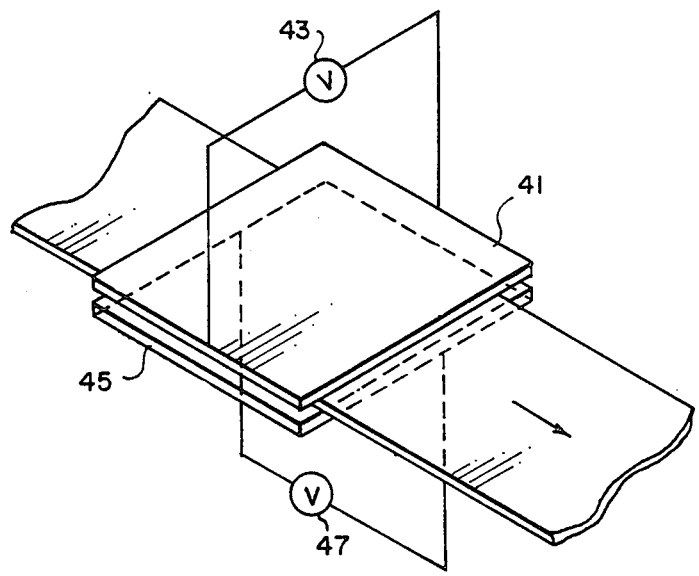
FIG. 3 is a diagramatic prospective illustration of a second embodiment of applying a rotating magnetic field having magnetic components only in the plane of the substrate.

FIG. 3 represents a second embodiment for subjecting the fluid paint layer 19 to a rotating magnetic field having no Z component while the magnetic paint layer is moving at a rapid rate on the substrate and still in the fluid condition. This embodiment is suitable for making magnetic media in very wide widths for example up to thirty and even fifty inches in width because it is not limited in the same manner as that of the Helmholtz coils. The embodiment utilizes two conductive plates such as, for example, copper plates which are disposed above and below the moving web as shown diagramatically in FIG. 1 as orientation station 21. The plate on the top of the moving web which is designated as reference character 41 has impressed thereupon by voltage source 43 a current which traverses across the width of the moving web. The plate 45 disposed beneath the moving web has a current which traverses across the plate in the direction of motion of the moving web due to the voltage source 47. The two currents impressed by voltage sources 43 and 47 are 90° out of phase with respect to each other and this causes a rotating magnetic field having components only in the x and y direction with no magnetic component out of the plane of the web or in the Z direction.

It should be understood that modification may be made without the departing from the gist of the present invention as disclosed hereinabove and defined in the following claims:

What is claimed is:

1. A method of making a magnetic recording film having the magnetic particles oriented in any given direction which comprises applying a magnetic paint to a substrate, subjecting the substrate containing the magnetic paint in an unfixed condition to a rotating magnetic field having magnetic components that lie only in a plane perpendicular to the given direction and fixing the magnetic paint.

2. A method of making a magnetic recording film having the magnetic particles oriented perpendicular to the plane of the film which comprises applying a magnetic paint to a substrate, subjecting the substrate containing the magnetic field having magnetic components that lie only in the plane of the substrate and fixing the magnetic paint.

3. The process of claim 2 wherein subsequent to fixing the magnetic paint a recording element is cut from the thus produced film.

4. The process of claim 3 wherein the recording element is a tape.

5. The process of claim 3 wherein the recording element is a disk.

* * * * *